United States Patent
In et al.

(10) Patent No.: US 9,010,707 B2
(45) Date of Patent: Apr. 21, 2015

(54) WALL MOUNTING APPARATUS FOR DISPLAY APPARATUS AND DISPLAY APPARATUS HAVING THE SAME

(75) Inventors: Woo Sung In, Hwaseong-si (KR); Jae Hoo Park, Suwon-si (KR); Jin Sung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/968,802

(22) Filed: Dec. 15, 2010

(65) Prior Publication Data

US 2011/0147557 A1    Jun. 23, 2011

(30) Foreign Application Priority Data

Dec. 21, 2009  (KR) .......................... 10-2009-0128154

(51) Int. Cl.
| | |
|---|---|
| *A47F 1/10* | (2006.01) |
| *F16M 11/18* | (2006.01) |
| *A47G 1/16* | (2006.01) |
| *F16M 11/10* | (2006.01) |
| *F16M 11/24* | (2006.01) |
| *F16M 13/02* | (2006.01) |
| *H04N 5/645* | (2006.01) |

(52) U.S. Cl.
CPC ................ *F16M 11/18* (2013.01); *A47G 1/164* (2013.01); *F16M 11/10* (2013.01); *F16M 11/24* (2013.01); *F16M 13/02* (2013.01); *H04N 5/645* (2013.01); *Y10S 248/917* (2013.01); *Y10S 248/919* (2013.01)

(58) Field of Classification Search
USPC ......... 248/328, 489, 493, 231.91, 329, 330.1, 248/492, 295.11, 324, 470, 917, 918, 919
See application file for complete search history.

(56) References Cited

U.S. PATENT DOCUMENTS

| | | | | |
|---|---|---|---|---|
| 769,695 | A | * | 9/1904 | Gurr .............................. 248/492 |
| 791,060 | A | | 5/1905 | Wallace |
| 4,892,284 | A | | 1/1990 | Kelrick |
| 6,484,993 | B2 | * | 11/2002 | Huffman ....................... 248/323 |

(Continued)

FOREIGN PATENT DOCUMENTS

| | | |
|---|---|---|
| EP | 2 116 755 A2 | 11/2009 |
| KR | 10-0666326 B1 | 1/2007 |

(Continued)

OTHER PUBLICATIONS

Communication dated Dec. 7, 2012 issued by the European Patent Office in counterpart European Patent Application No. 10193409.9.

*Primary Examiner* — Monica Millner
(74) *Attorney, Agent, or Firm* — Sughrue Mion, PLLC (57) ABSTRACT

A wall mount for a display apparatus to vertically move an apparatus body of the display apparatus in an electromotive manner and a display apparatus having the same are provided. A wire is mounted at the rear of the apparatus body. The wall mount includes a plurality of wire hanging members fixed to a rear of the apparatus; a wire connected between the wire hanging members; a guide member which is configure to move vertically while supporting the wire, to thereby move the apparatus vertically, the guide member not being exposed when the apparatus is viewed from a front of the apparatus; and a base member which is configured to be fixed to the wall to vertically move the guide member in an electromotive manner.

24 Claims, 10 Drawing Sheets

(56) References Cited

U.S. PATENT DOCUMENTS

| | | |
|---|---|---|
| 6,905,101 B1 | 6/2005 | Dittmer |
| 7,793,898 B2 * | 9/2010 | Dong et al. ............... 248/157 |
| 7,883,069 B2 * | 2/2011 | Park et al. ............... 248/328 |
| 8,191,296 B2 * | 6/2012 | Xu ............................. 40/624 |
| 8,286,927 B2 * | 10/2012 | Sweere et al. ........ 248/297.21 |
| 2004/0051742 A1 * | 3/2004 | Lee et al. ................ 345/836 |
| 2005/0152102 A1 * | 7/2005 | Shin ......................... 361/681 |
| 2006/0250347 A1 * | 11/2006 | Bertoncini ............... 345/103 |
| 2007/0108791 A1 * | 5/2007 | Okninski ................ 296/97.12 |
| 2009/0278018 A1 * | 11/2009 | Park et al. ................. 248/492 |
| 2012/0175480 A1 * | 7/2012 | Lee ......................... 248/295.11 |

FOREIGN PATENT DOCUMENTS

| | | |
|---|---|---|
| WO | 98/58232 A1 | 12/1998 |
| WO | 99/60898 A1 | 12/1999 |
| WO | 2011/040674 A1 | 4/2011 |

\* cited by examiner

WALL MOUNTING APPARATUS FOR DISPLAY APPARATUS AND DISPLAY APPARATUS HAVING THE SAME

CROSS-REFERENCE TO RELATED APPLICATION

This application claims priority from Korean Patent Application No. 10-2009-0128154, filed on Dec. 21, 2009 in the Korean Intellectual Property Office, the disclosure of which is incorporated herein by reference.

BACKGROUND

1. Field

Apparatuses consistent with the exemplary embodiments relate to an electrically movable wall mounting apparatus for a display apparatus and a display apparatus having the same.

2. Description of the Related Art

As a display apparatus such as a liquid crystal display (LCD) or a plasma display panel (PDP) is widely used, a screen size of the display apparatus is increased and a thickness of the display apparatus is decreased to achieve a high quality image with a small thickness to occupy a small space in which the display apparatus is installed.

The display apparatus may be directly mounted to a wall or may be disposed on a floor or a table using an additional stand.

When the display apparatus is mounted to the wall using a wall mounting apparatus, a user may move an apparatus body of the display apparatus to clearly watch the screen of the display apparatus.

SUMMARY

One or more exemplary embodiments provide a wall mounting apparatus for a display apparatus to vertically move an apparatus body of the display apparatus in an electromotive manner and a display apparatus having the same.

One of more exemplary embodiments also provide a wall mounting apparatus for a display apparatus which is not visible from the front of the display apparatus and a display apparatus having the same.

In accordance with an aspect of an exemplary embodiment, there is provided a display apparatus which includes an apparatus body including a screen, a plurality of wire hanging members fixed to a rear of the apparatus body, a wire connected between the wire hanging members, a guide member which is configured to move vertically while supporting the wire, to thereby move the apparatus body vertically, and a base member which is configured to be fixed to a wall to vertically move the guide member.

The base member may include an electromotive module to provide drive force to move the guide member and a drive circuit board to supply power and transmit a control signal to the electromotive module.

The electromotive module may include a motor to generate drive force, a plurality of gears connected to the motor to receive the drive force from the motor, a pair of pulleys rotated by the drive force from the gears, and a drive wire connected between the pulleys to apply force to the guide member to vertically move the guide member.

The guide member may include a guide rod vertically moving through the base member and a holder member provided at an upper part of the guide rod to receive and support the wire.

A rod support member is provided at a lower end of the guide rod, and A drive wire groove, in which the drive wire is fitted, is provided along an outside of the rod support.

The base member may further include a base plate on which the electromotive module and the drive circuit board are mounted, a guide frame coupled to the base plate to guide the vertical movement of the guide member, and a base cover directly fixed to the wall to cover the base plate.

The guide member may have a length less than a height of the apparatus body.

The guide rod may include a bent guide rod convex toward the base member and connected to the apparatus body.

In accordance with an aspect of another exemplary embodiment, there is provided a display apparatus which includes an apparatus body including a screen, a mount which connects the apparatus body to an outside surface and includes a motor unit which moves the apparatus body with respect to the outside surface, and a controller which controls the motor unit through a user interface manipulated by a user.

The user interface may be configured to receive a plurality of commands input by the user and the controller controls an operation of the motor unit according to the plurality of commands.

The plurality of commands may be input to the user interface through a remote control. The user interface may be implemented in the controller.

The user interface may be provided through an on screen display (OSD) to display information on the operation of the motor unit on the screen.

The plurality of commands may include an upward movement command to move the apparatus body upward and a downward movement command to move the apparatus body downward.

The plurality of commands may further include a memory command to store to store information about a position of the apparatus body with respect to the outside surface.

The plurality of commands may further include a memory execution command to return the apparatus body to the position according to the memory command.

The motor unit may be operated to return the apparatus body to an initial position with respect to the outside surface when the display apparatus is turned off.

In accordance with an aspect of another exemplary embodiment, there is provided a wall mount to mount an apparatus to a wall, the wall mount includes a plurality of wire hanging members fixed to a rear of the apparatus, a wire connected between the wire hanging members, a guide member which is configure to move vertically while supporting the wire, to thereby move the apparatus vertically, the guide member not being exposed when the apparatus is viewed from a front of the apparatus, and a base member which is configured to be fixed to the wall to vertically move the guide member in an electromotive manner.

The base member may include an electromotive module to provide drive force to move the guide member and a drive circuit board to supply power and transmit a control signal to the electromotive module.

The electromotive module may include a motor to generate the drive force, a plurality of gears connected to the motor to receive the drive force from the motor, a pair of pulleys rotated by the drive force from the gears, and a drive wire connected between the pulleys to apply force to the guide member to vertically move the guide member.

The guide member may include a guide rod vertically moving through the base member and a holder member provided at an upper part of the guide rod to receive and support the wire.

A rod support member is provided at a lower end of the guide rod to support the guide rod, and a drive wire groove, in which the drive wire is fitted, is provided along an outside of the rod support member.

The base member may further include a base plate on which the electromotive module and the drive circuit board are mounted, a guide frame coupled to the base plate to guide the vertical movement of the guide member, and a base cover directly fixed to the wall to cover the base plate.

The guide member may have a length less than a height of the apparatus body.

The guide rod may include a bent guide rod convex toward the base member and connected to the apparatus body.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Exemplary embodiments will be described in detail with reference to the accompanying drawings, in which like reference numerals refer to like elements throughout.

Figure 1:
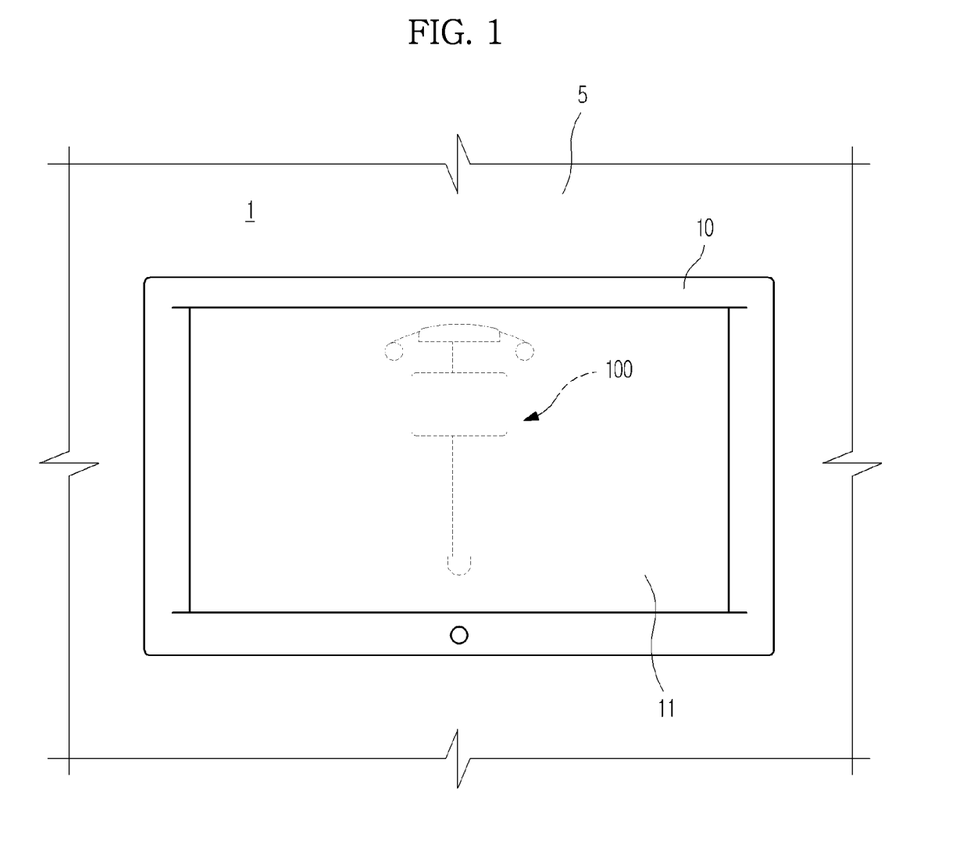
FIG. 1 is a front view illustrating a display apparatus mounted to a wall, according to an exemplary embodiment.
Figure 2:
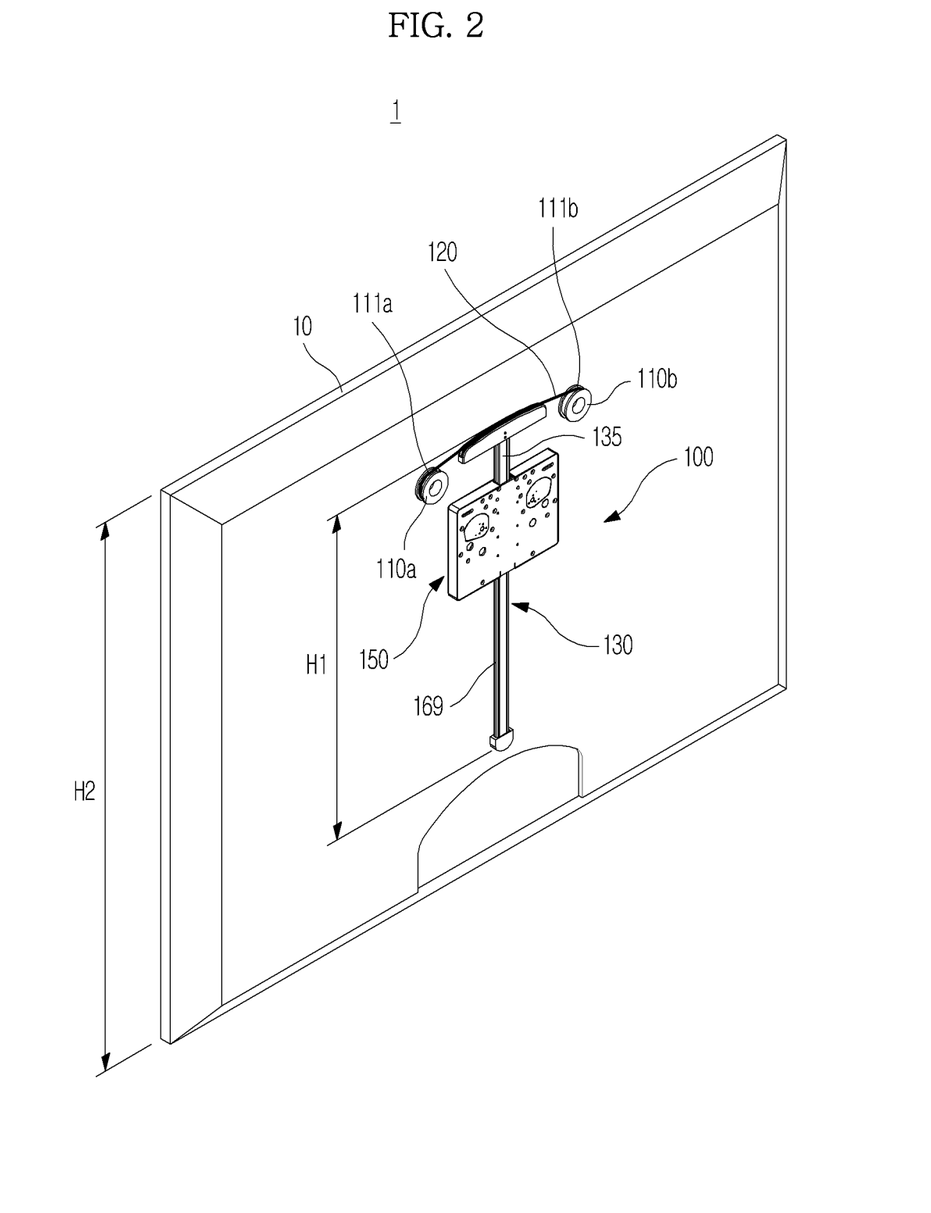
FIG. 2 is a rear perspective view of the display apparatus of FIG. 1, according to an exemplary embodiment.
Figure 3:
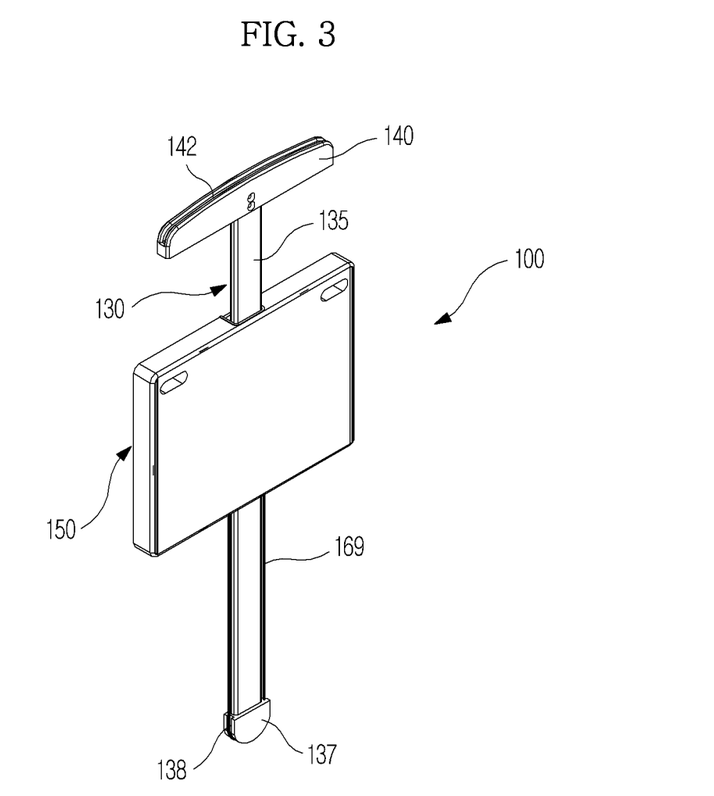
FIG. 3 is a perspective view illustrating a wall mounting apparatus for a display apparatus according to an exemplary embodiment.
Figure 4:
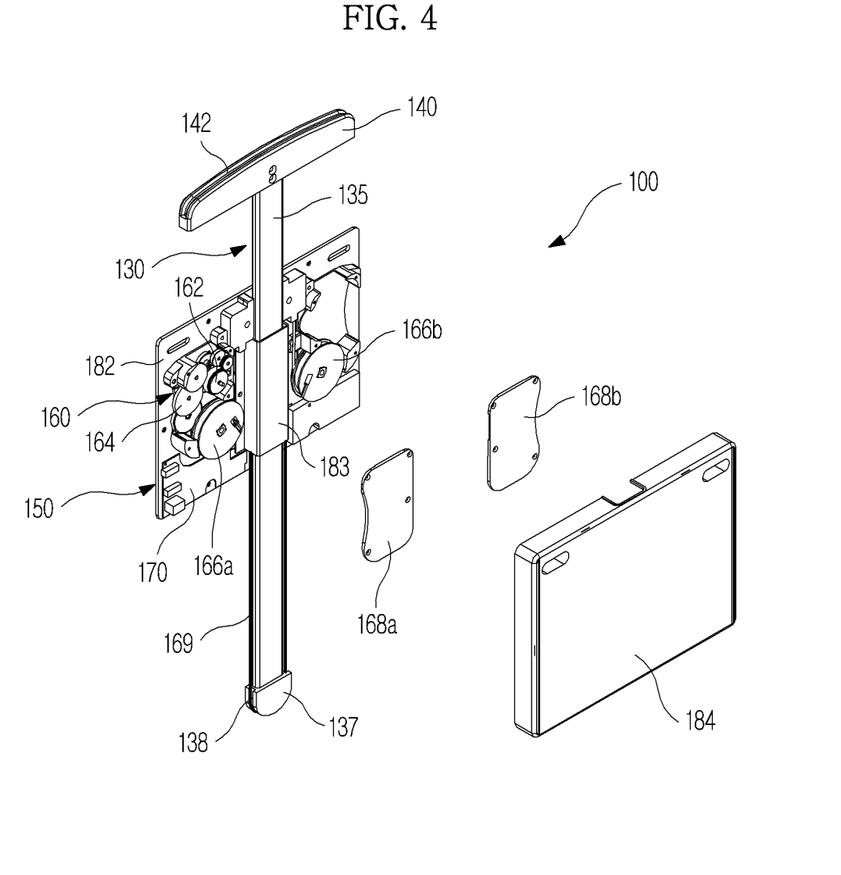
FIG. 4 is an exploded perspective view of the wall mounting apparatus of FIG. 3, according to an exemplary embodiment.

FIG. 1 is a front view illustrating a display apparatus 1 mounted to a wall, according to an exemplary embodiment, and FIG. 2 is a rear perspective view of the display apparatus 1 of FIG. 1, according to an exemplary embodiment. FIG. 3 is a perspective view illustrating a wall mounting apparatus for a display apparatus according to an exemplary embodiment, and FIG. 4 is an exploded perspective view of the wall mounting apparatus of FIG. 3, according to an exemplary embodiment.

As shown in FIGS. 1 and 2, the display apparatus 1 includes an apparatus body 10 having a screen 11 and a wall mounting apparatus 100 to mount the apparatus body 10 to a wall 5. The apparatus body 10 may be a slim TV such as a liquid crystal display (LCD) or a plasma display panel (PDP).

As shown in FIGS. 1 to 4, the wall mounting apparatus 100 includes wire hanging members 110a and 110b fixed to the rear of the apparatus body 10, a wire 120 connected between the wire hanging members 110a and 110b, a guide member 130 to move vertically while supporting the wire 120, and a base member 150 fixed to the wall 5 to vertically move the guide member 130.

The wire hanging members 110a and 110b are structures to hang the wire 120 to the rear of the apparatus body 10. The wire hanging members 110a and 110b are fixed to the rear of the apparatus body 10. The wire hanging members 110a and 110b are provided with hanging grooves 111a and 111b, respectively, around which the wire 120 is wound.

The wire 120 is connected between the wire hanging members 110a and 110b. The wire 120 is wound around the hanging grooves 111a and 111b of the wire hanging members 110a and 110b. The wire 120 may be formed of a plurality of steel wires. Alternatively, the wire 120 may be embodied by a chain. That is, any member connected between the wire hanging members 110a and 110b to support the weight of the apparatus body 10 may be used as the wire 120.

The guide member 130 moves vertically while supporting the wire 120. The vertical movement of the guide member 130 moves the apparatus body 10 vertically. The guide member 130 includes a guide rod 135 vertically moving through the base member 150, a holder member 140 provided at the upper end of the guide rod 135 to receive and support the wire 120, and a rod support member 137 coupled to the lower end of the guide rod 135.

The guide rod 135 is straightly moved. The holder member 140 is coupled to the upper end of the guide rod 135, and the rod support member 137 is coupled to the lower end of the guide rod 135. The guide rod 135 is moved vertically by the base member 150.

The holder member 140 is a structure to support the wire 120. The holder member 140 is provided with a holder groove 142, in which the wire 120 is fitted and by which the separation of the wire 120 from the holder member 140 is prevented.

The rod support member 137 serves to transmit force from a drive wire 169, which will be described later, to the guide member 130. The rod support member 137 is provided along the outside thereof with a drive wire groove 138, in which the drive wire 169 is fitted and by which the separation of the drive wire 169 from the rod support member 137 is prevented.

The guide member 130 has a length H1 less than a height H2 of the apparatus body 10. This serves to prevent exposure of the wall mounting apparatus 100 when viewed from the front of the display apparatus 1, thereby securing a user's visual field.

The base member 150 is fixed to the wall 5 to provide drive force to vertically move the guide member 130. The base member 150 includes an electromotive module 160 to provide drive force to move the guide member 130, and a drive circuit board 170 to supply power and transmit a control signal to the electromotive module 160.

The electromotive module 160 and the drive circuit board 170 are mounted at a base plate 182. To the middle of the base plate 182 is coupled a guide frame 183 to guide the vertical movement of the guide rod 135. Opposite sides of the guide frame 183 are covered by electromotive module covers 168a and 168b to protect a motor 162 and a plurality of gears 164.

The base plate 182, at which the electromotive module 160, the drive circuit board 170, the guide frame 183 and the electromotive module covers 168a and 168b are mounted, is covered by a main cover 184. The main cover 184 is directly fixed to the wall to protect components in the base plate 150.

The electromotive module 160 includes a motor 162 to generate drive force, a plurality of gears 164 connected to the motor 162 to transmit the drive force, a pair of pulleys 166a and 166b configured to be rotated by the drive force from the gears 164, and a drive wire 169 connected between the pulleys 166a and 166b to support the rod support member 137 of the guide rod 135.

When the motor 162 is operated, drive force from the motor 162 rotates the pulleys 166a and 166b via the gears 164, with the result that the drive wire 169 connected between the pulleys 166a and 166b is wound on or unwound from the pulleys 166a and 166b. When the drive wire 169 is wound on the pulleys 166a and 166b, the length of the drive wire 169 exposed below the base member 150 is decreased, and therefore, the drive wire 169 pushes the rod support member 137 upward. As a result, the guide member 130 is moved upward to push the wire 120 upward, and therefore, the apparatus body 10 is moved upward. When the motor 162 is rotated in the opposite direction such that the drive wire 169 is unwound from the pulleys 166a and 166b, the length of the drive wire 169 exposed below the base member 150 is increased. As a result, the apparatus body 10 moves downward by a distance corresponding to the increased length of the drive wire 169 due to the weight of the apparatus body 10.

The drive circuit board 170 is electrically connected to the apparatus body 10 to receive a control signal from a controller 520, which will be described later in reference to FIG. 6, to operate the electromotive module 160, and power from the apparatus body 10. The drive circuit board 170 is also electrically connected to the electromotive module 160 to control the electromotive module 160 according to the control signal from the controller 520 when the power is supplied to the drive circuit board 170. Specifically, the drive circuit board 170 supplies power to the motor 162 of the electromotive module 160 and controls the rotation of the motor 162. The drive circuit board 170 may receive the power from a remote control 191 which will be described later in reference to FIG. 5.

In this exemplary embodiment, the drive circuit board 170 is disposed in the base member 150 although the drive circuit board 170 may be disposed in the apparatus body 10.

Hereinafter, upward and downward movement of the display apparatus with the above-stated construction will be described.

Figure 5:
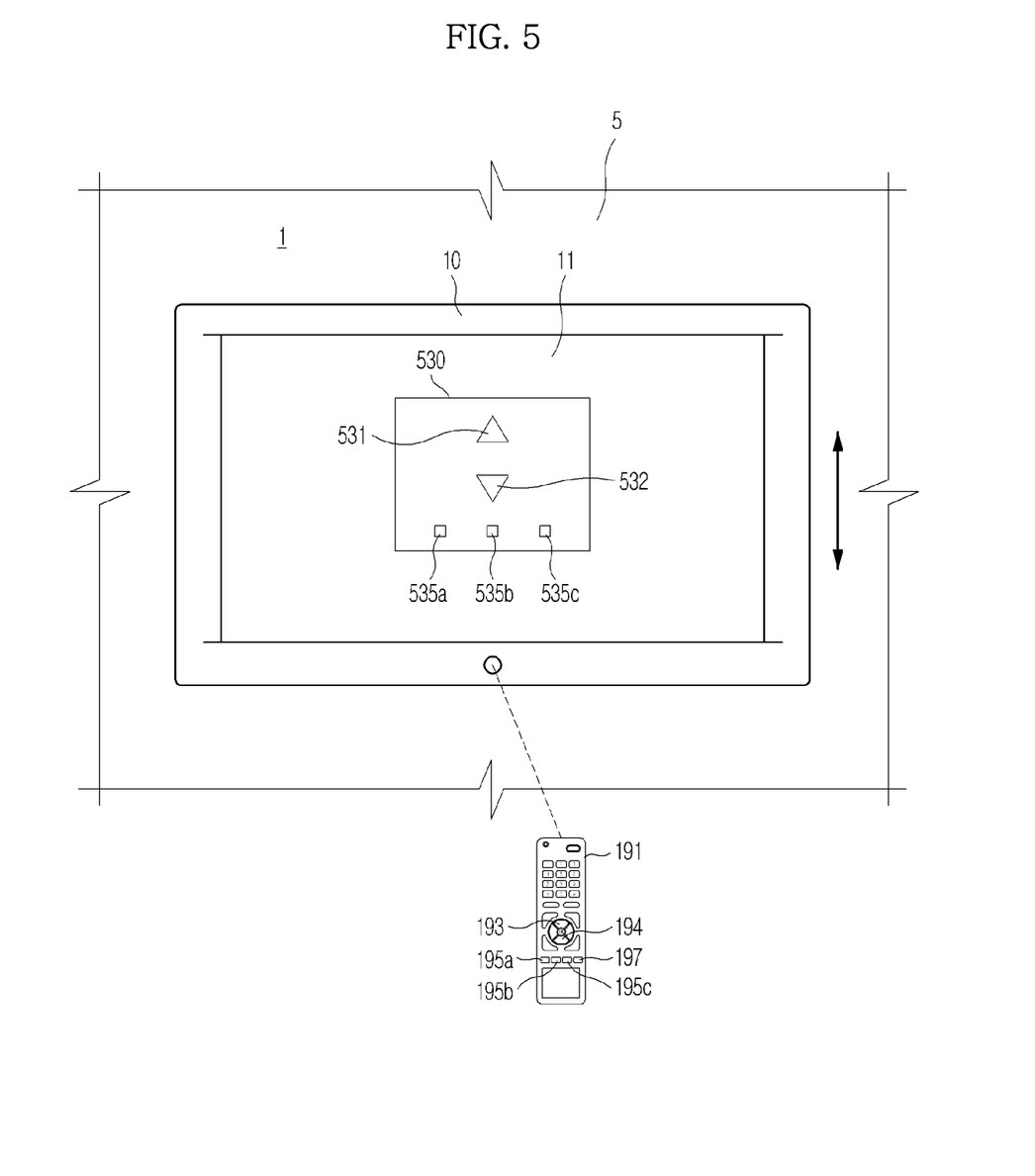
FIG. 5 is a view illustrating upward and downward movement of the display apparatus 1 shown in FIGS. 1-4, according to an exemplary embodiment.

FIG. 5 is a view illustrating upward and downward movement of the display apparatus 1 shown in FIGS. 1-4, according to an exemplary embodiment. FIG. 6 is a block diagram illustrating a system 400 generating upward and downward movement of the display apparatus 1, according to an exemplary embodiment. FIGS. 7A to 7C are rear perspective views of the display apparatus 1 which moves upward by the wall mounting apparatus 100 shown in FIGS. 1-4, according to an exemplary embodiment.

Figure 6:
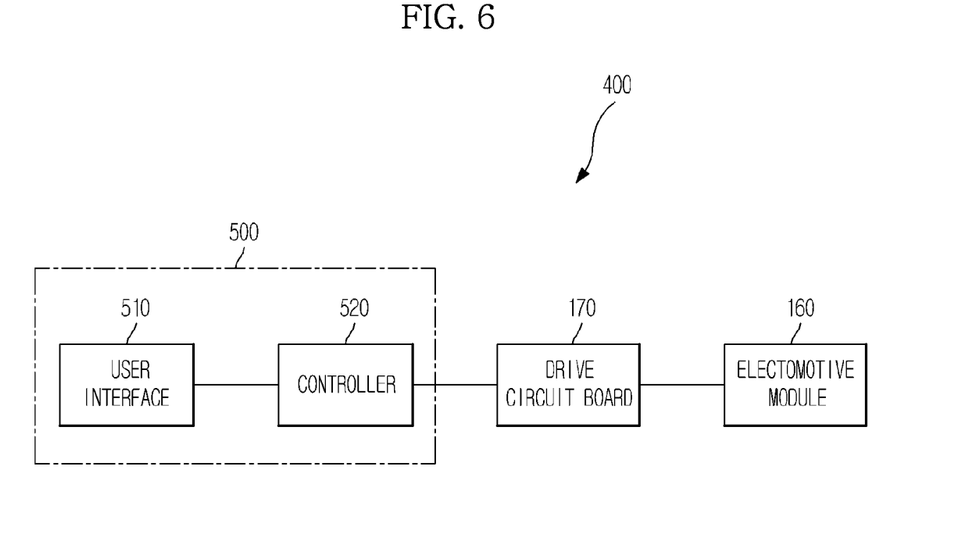
FIG. 6 is a block diagram illustrating a system 400 generating upward and downward movement of the display apparatus 1, according to an exemplary embodiment.
Figure 7A:
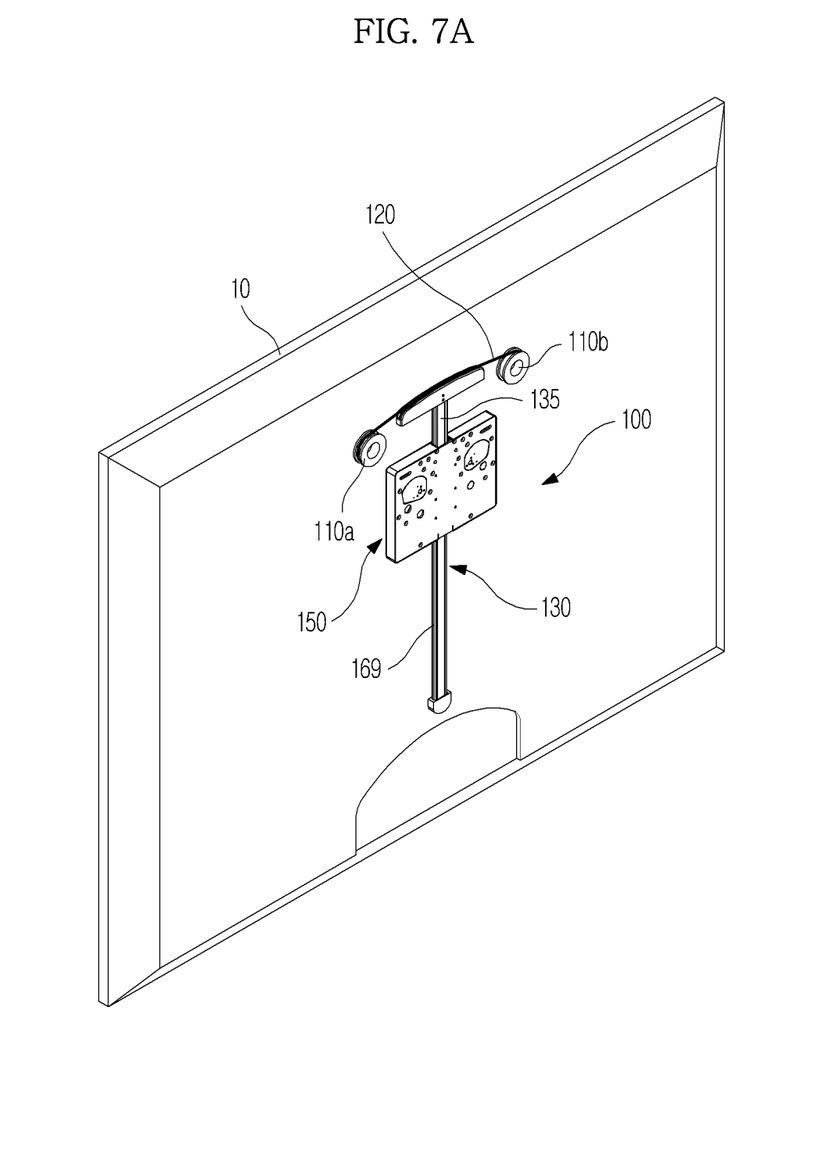
FIGS. 7A to 7C are rear perspective views of the display apparatus 1 which moves upward by the wall mounting apparatus 100 shown in FIGS. 1-4, according to an exemplary embodiment.
Figure 7B:
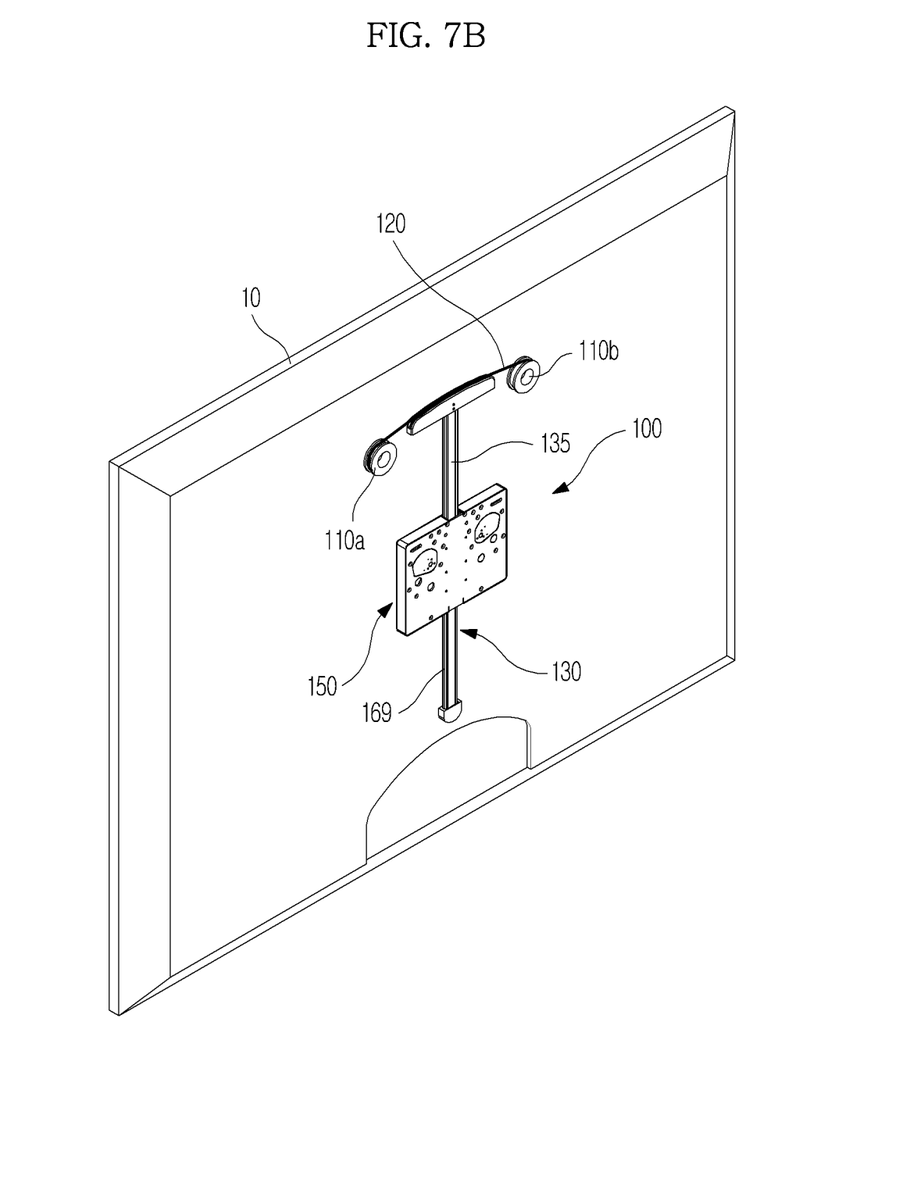
Figure 7C:
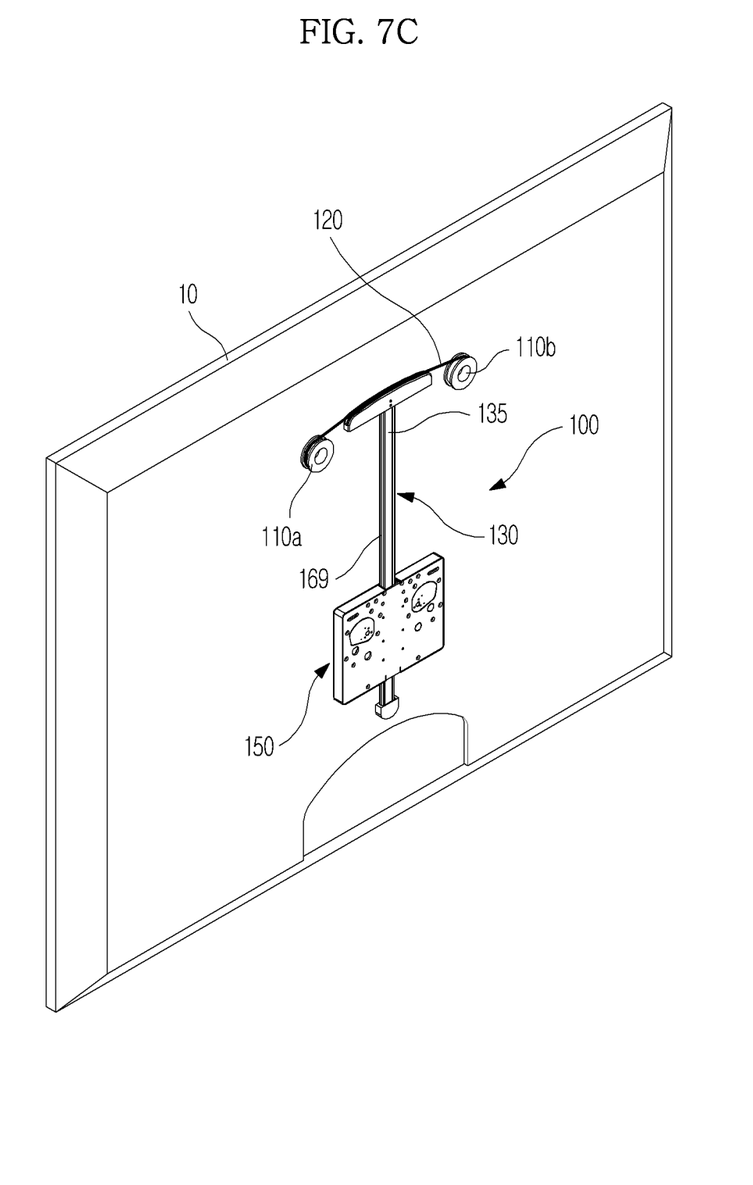

Referring to FIGS. 5 and 6, the system 400 generating upward and downward movement of the display apparatus includes the electromotive module 160 and the drive circuit board 170 shown in FIGS. 2-4, and a user interface unit 500. The electromotive module 160 is operatively connected to the user interface unit 500 manipulated by a user.

The user interface unit 500 includes a user interface 510 to allow a user to input a request command and a controller 520 to control the operation of the electromotive module 160 according to the request command. The user interface 510 may be implemented through an on screen display (OSD) 530 to display information on the operation of the electromotive module 160 on the screen 11. However, the user interface 510 may be implemented by the remote control 101 or various buttons (not shown) provided at the apparatus body 10 without using the OSD 530, according to exemplary embodiments. The controller 520 may be disposed in the base member 150, the remote control 191 or another part of the apparatus body 10 although the controller 520 is not shown in FIGS. 1-5, according to exemplary embodiments. The controller 520 may also be implemented as a software module included in the base member 150, the remote control 191 or the apparatus body 10, according to exemplary embodiments. The operation of the electromotive module 160 is selected using a position setting menu displayed through the OSD 530 module.

The request command is input through the remote control 191. When an up button 193 or a down button 194 of the remote control 191 is pushed, the position setting menu appears for the user to adjust the position of the apparatus body 10.

The request command includes an upward movement command to move the apparatus body 10 upward and a downward movement command to move the apparatus body 10 downward. The upward movement command is input by pushing the up button 193, and the downward movement command is input by pushing the down button 194.

When the upward movement command and the downward movement command are input, an upward movement indicating mark 531 and a downward movement indicating mark 532 provided on the OSD 530.

At the same time, the controller 520 transmits a control signal, to operate the electromotive module 160, to the drive circuit board 170, and thus, the electromotive module 160 is operated according to the control signal of the controller 520, with a result that the apparatus body 10 is moved upward and downward.

The user may input a memory command to store information about the position of the apparatus body 10 as a request command.

That is, when a memory button 197 of the remote control 191 is pushed in a state in which the apparatus body 10 is moved upward or downward, and a red button 195a, a green button 195b or a yellow button 195c of the remote control 191 is pushed to select a first storage space 535a, a second storage space 535b or a third storage space 535c, information about the raised or lowered position of the apparatus body 10 with respect to the base member 170 is stored in a memory (not shown) disposed in the apparatus body 10 or the base member 150. The first storage space 535a, the second storage space 535b and the third storage space 535c are memory marks which the user selects to store information about the position of the apparatus body 10.

A memory execution command is used to recall information about the stored position as follows. When the up button 193 or the down button 194 of the remote control 191 is pushed to enter the position setting menu, and one of the buttons 195a, 195b and 195c is pushed, the apparatus body 10 is moved upward or downward to the position corresponding to one of the storage spaces 535a, 535b and 535c.

When the display apparatus 1 is turned off, the base member 150 may return to an initial position where the base member 150 is located at the middle of the guide member 130, according to an exemplary embodiment. This is because the apparatus body 10 moved upward or downward when not in use does not provide an aesthetically pleasing appearance.

The upward movement of the apparatus body 10 when the user pushes the up button 193 using the remote control 191 is shown in detail in FIGS. 7A to 7C.

When the user pushes the up button 193 to input an upward movement command through the user interface 510, the upward movement command is transmitted to the electromotive module 160 via the controller 520 and the drive circuit board 170. Consequently, the motor 162 of the electromotive module 160 is rotated in the direction in which the drive wire 169 is wound on the pulleys 166a and 166b, and therefore, the length of the drive wire 169 exposed below the base member 150 is decreased. As a result, the guide member 130 is gradually moved upward by the drive wire 169, and, at the same time, the apparatus body 10 is moved upward.

The downward movement of the apparatus body 10 is similar to the upward movement of the apparatus body 10, and therefore, a detailed description thereof will not be given.

When using the wall mounting apparatus 100 with the above-stated construction according to this exemplary embodiment, the position of the apparatus body 10 is easily moved through convenient manipulation of the remote control 191. Also, the wall mounting apparatus 100 is hidden behind the apparatus body 10, and therefore, a user's visual field is secured.

Hereinafter, another exemplary embodiment will be described. A description of the same components of this exemplary embodiment as the previous exemplary embodiment will not be given.

Figure 8:
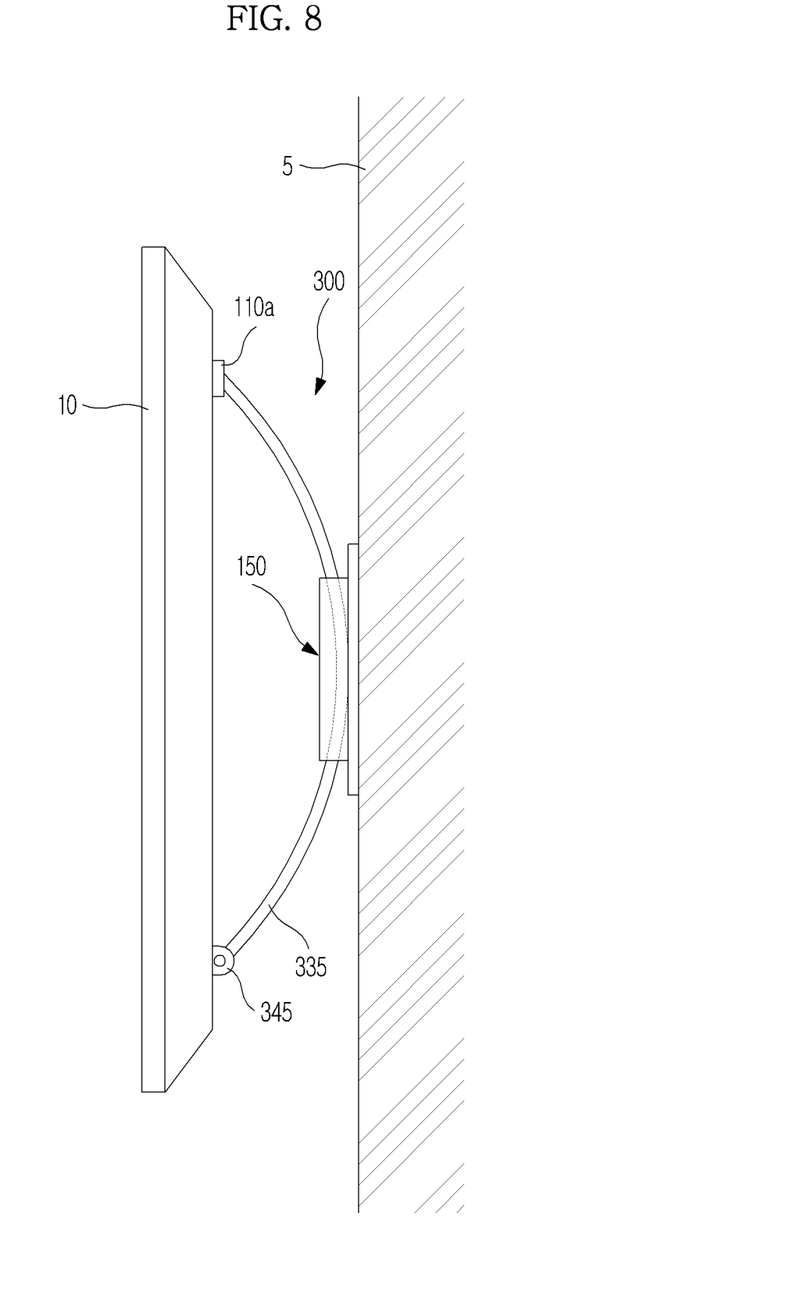
FIG. 8 is a view illustrating a display apparatus according to another exe exemplary embodiment.

FIG. 8 is a view illustrating a display apparatus according to another exemplary embodiment.

Referring to FIG. 8, the display apparatus includes a wall mounting apparatus 300 different from that of the previous exemplary embodiment.

That is, a guide member of this exemplary embodiment includes a bent guide rod 335 convex toward the base member 150. The bent guide rod 335 is provided at the lower end thereof with a lower holder member 345 connected to the apparatus body 10.

When the bent guide rod 335 is moved upward and downward, the apparatus body 10 is moved upward and downward in a tilted state. As a result, a user may watch the screen 11 of the apparatus body 10 straight, and therefore, user satisfaction is improved. The lower holder member 345 serves to prevent the bent guide rod 335 from being separated from the apparatus body 10 when the apparatus body 10 is tilted.

Other components of this exemplary embodiment are identical to those of the previous embodiment.

As is apparent from the above description, the display apparatus and the wall mounting apparatus for the same include the electromotive module, thereby achieving upward and downward movement of the apparatus body of the display apparatus in the electromotive manner.

Also, the length of the guide member is less than the height of the apparatus body, and therefore, the exposure of the wall mounting apparatus is prevented, when viewed from the front of the display apparatus, to secure a user's visual field.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A display apparatus comprising:
    an apparatus body comprising a screen;
    a plurality of wire hanging members fixed to a rear of the apparatus body;
    a wire connected between the wire hanging members;
    an electromotive device comprising:
        a base member; and
        a guide member comprising means for moving vertically through the base member, the guide member further comprising means to support the wire at an uppermost portion of the guide member such that the guide member is removeably coupled to the wire;
    wherein the base member comprises:
        an electromotive module which provides a drive force to move the guide member vertically; and
        a guide frame to guide a vertical movement of the guide member,
    wherein the electromotive module comprises:
        a motor which generates the drive force;
        a plurality of gears which are connected to the motor to receive the drive force transmitted from the motor;
        a pair of pulleys which are rotated by the drive force from the gears; and
        a drive wire connected between the pulleys to apply force to the guide member to vertically move the guide member.

2. The display apparatus according to claim 1, wherein the base member further comprises:
    a drive circuit board which supplies power and transmits a control signal to the electromotive module.

3. The display apparatus according to claim 2, wherein the guide member comprises:
    a guide rod which vertically extends through the base member; and
    wherein the means to support the wire comprises a holder member which is provided at an uppermost portion of the guide rod and which receives and supports the wire.

4. The display apparatus according to claim 1, wherein the guide member comprises a rod support member provided at a lower end of the guide rod to support the guide rod, and
    wherein the rod support member comprises a drive wire groove in which the drive wire is fitted.

5. The display apparatus according to claim 1, wherein the base member further comprises:
    a base plate on which the electromotive module and the drive circuit board are mounted;
    a guide frame coupled to the base plate to guide the vertical movement of the guide member; and
    a base cover directly fixed to the wall to cover the base plate.

6. The display apparatus according to claim 1, wherein a height of the guide member is less than a height of the apparatus body.

7. The display apparatus according to claim 3, wherein the guide rod comprises a bent guide rod convex toward the base member and connected to the apparatus body.

8. A display apparatus comprising:
    an apparatus body comprising a screen and a wire connected to a rear of the screen;
    a mount removeably connected to a rear side of the apparatus body, the mount comprising:
        a base member, and
        a guide member comprising means to move vertically through the base member and further comprising means to support the wire at an uppermost portion of the guide member such that the guide member is removeably coupled to the wire,
    wherein the base member comprises:
        an electromotive module which provides a drive force to move the guide member vertically, and
        a guide frame to guide a vertical movement of the guide member; and
    wherein the mount further comprises a controller which controls the electromotive module through a user interface manipulated by a user, and wherein the electromotive module comprises:
a motor which generates the drive force;
a plurality of gears which are connected to the motor to receive the drive force transmitted from the motor;
a pair of pulleys which are rotated by the drive force from the gears; and
a drive wire connected between the pulleys to apply force to the guide member to vertically move the guide member.

9. The display apparatus according to claim 8, wherein the user interface receives a plurality of commands input by the user and the controller controls an operation of the electromotive module according to the plurality of commands.

10. The display apparatus according to claim 9, wherein the plurality of commands are input to the user interface through a remote control.

11. The display apparatus according to claim 9, wherein the user interface is provided through an on screen display (OSD) to display information on the operation of the electromotive module on the screen.

12. The display apparatus according to claim 11, wherein the plurality of commands comprise an upward movement command to move the apparatus body upward and a downward movement command to move the apparatus body downward.

13. The display apparatus according to claim 9, wherein the plurality of commands comprise an upward movement command to move the apparatus body upward and a downward movement command to move the apparatus body downward.

14. The display apparatus according to claim 13, wherein the controller comprises the user interface.

15. The display apparatus according to claim 13, wherein the plurality of commands further comprise a memory command to store information about a position of the apparatus body.

16. The display apparatus according to claim 15, wherein the plurality of commands further comprise a memory execution command to return the apparatus body to the position according to the memory command.

17. The display apparatus according to claim 8, wherein the motor unit returns the apparatus body to an initial position when the display apparatus is turned off.

18. A wall mount to mount an apparatus to a wall, the wall mount comprising:
a plurality of wire hanging members fixed to a rear of the apparatus;
a wire connected between the wire hanging members;
a guide member comprising:
means for supporting the wire at an uppermost portion of the guide member such that the guide member is removeably coupled to the wire, and
means for moving vertically while supporting the wire, thereby moving the apparatus vertically with respect to a base member,
wherein a cross-sectional area of the guide member is smaller than a cross-sectional area of the apparatus as viewed from a rear of the apparatus; and
the base member comprising means for moveably connecting to the guide member;
wherein the means for moving vertically while supporting the wire comprises an electromotive member comprising:
a motor which generates a drive force;
a plurality of gears which are connected to the motor to receive the drive force transmitted from the motor;
a pair of pulleys which are rotated by the drive force from the gears; and
a drive wire connected between the pulleys to apply force to the guide member to vertically move the guide member.

19. The wall mount according to claim 18, wherein the base member comprises:
a drive circuit board which supplies power and transmit a control signal to the electromotive module.

20. The wall mount according to claim 19, wherein the guide member comprises:
a guide rod which vertically extends through the base member; and
a holder member which is disposed at an uppermost portion of the guide rod and which supports the wire.

21. The wall mount according to claim 20, wherein the guide member further comprises a rod support member disposed at a lower end of the guide rod, and
wherein the rod support member comprises a drive wire groove in which the drive wire is fitted.

22. The wall mount according to claim 19, wherein the base member further comprises:
a base plate on which the electromotive module and the drive circuit board are mounted;
a guide frame, coupled to the base plate, which guides the vertical movement of the electromotive guide member; and
a base cover which is directly fixed to the wall and which covers the base plate.

23. The wall mount according to claim 18, wherein a height of the guide member is less than a height of the apparatus body.

24. The wall mount according to claim 20, wherein the guide rod comprises a bent guide rod convex toward the base member and connected to the apparatus body.

* * * * *